(12) United States Patent
Garg et al.

(10) Patent No.: US 12,260,584 B2
(45) Date of Patent: Mar. 25, 2025

(54) TECHNOLOGIES FOR DETECTING CROP MARKS IN ELECTRONIC DOCUMENTS USING REFERENCE IMAGES

(71) Applicant: CIMPRESS SCHWEIZ GMBH, Winterthur (CH)

(72) Inventors: Anshul Garg, Bangalore (IN); Ajay Joshi, Bedford, MA (US)

(73) Assignee: CIMPRESS SCHWEIZ GMBH, Winterthur (CH)

(*) Notice: Subject to any disclaimer, the term of this patent is extended or adjusted under 35 U.S.C. 154(b) by 359 days.

(21) Appl. No.: 17/691,816

(22) Filed: Mar. 10, 2022

(65) Prior Publication Data
US 2022/0292716 A1 Sep. 15, 2022

Related U.S. Application Data

(60) Provisional application No. 63/159,845, filed on Mar. 11, 2021.

(51) Int. Cl.
G06T 7/73 (2017.01)
G06T 7/10 (2017.01)
G06T 7/13 (2017.01)
G06V 10/60 (2022.01)

(52) U.S. Cl.
CPC .......... G06T 7/74 (2017.01); G06T 7/10 (2017.01); G06T 7/13 (2017.01); G06V 10/60 (2022.01); G06T 2207/20021 (2013.01); G06T 2207/20132 (2013.01); G06T 2207/30204 (2013.01)

(58) Field of Classification Search
CPC ............ G06T 7/74; G06T 2207/20132; G06T 2207/30204; G06V 10/245; G06V 30/40
See application file for complete search history.

(56) References Cited

U.S. PATENT DOCUMENTS

| | | | |
|---|---|---|---|
| 6,956,587 B1 * | 10/2005 | Anson | H04N 1/3878 345/620 |
| 7,151,547 B2 * | 12/2006 | Lin | G06T 11/60 345/627 |
| 8,682,075 B2 * | 3/2014 | Reddy | G06V 30/1444 382/176 |
| 9,524,445 B2 | 12/2016 | Campbell | |
| 10,339,374 B1 * | 7/2019 | Pribble | G06V 10/243 |

(Continued)

FOREIGN PATENT DOCUMENTS

| | | | |
|---|---|---|---|
| CN | 108345881 A | 7/2018 | |
| EP | 1861826 B1 * | 10/2018 | ............. G06T 11/60 |

OTHER PUBLICATIONS

International Application No. PCT/IB2020/061152, International Search Report and Written Opinion, mailed Feb. 17, 2021.

Primary Examiner — Michael Robert Cammarata
(74) Attorney, Agent, or Firm — MARSHALL, GERSTEIN & BORUN LLP

(57) ABSTRACT

Systems and methods for detecting crop marks depicted in digital images are disclosed. According to certain aspects, an electronic device detects a set of crop marks in a reference digital image and aligns the reference digital image with an input digital image. Based on locations of the detected crop marks as aligned to the input digital image, the electronic device detects a set of partial crop marks in the input digital image. As a result, the partial crop marks in the input digital image may be removed.

20 Claims, 16 Drawing Sheets

(56) References Cited

U.S. PATENT DOCUMENTS

| | | |
|---|---|---|
| 11,676,252 B2 * | 6/2023 | Burke ........................ G06T 5/77 |
| | | 382/284 |
| 2005/0036708 A1 | 2/2005 | Boll |
| 2005/0083556 A1 | 4/2005 | Carlson |
| 2007/0116350 A1 | 5/2007 | Cheverton |
| 2007/0158427 A1 | 7/2007 | Zhu et al. |
| 2011/0102817 A1 | 5/2011 | Hoover et al. |
| 2011/0292449 A1 | 12/2011 | Tan |
| 2012/0200885 A1 | 8/2012 | Matsuzawa |
| 2014/0136962 A1 * | 5/2014 | Fischer ................. G06T 7/0002 |
| | | 715/250 |
| 2016/0044197 A1 | 2/2016 | Kang et al. |
| 2018/0021969 A1 * | 1/2018 | Fujita .................... B41J 11/663 |
| | | 83/286 |
| 2018/0373950 A1 * | 12/2018 | Gong ..................... G06V 10/22 |
| 2019/0335064 A1 | 10/2019 | Nakamura |
| 2021/0158532 A1 * | 5/2021 | Garg ......................... G06T 7/90 |
| 2021/0407047 A1 * | 12/2021 | Goel ......................... G06T 7/12 |
| 2024/0071042 A1 * | 2/2024 | Sengupta ............... H04N 7/147 |
| 2024/0230810 A1 * | 7/2024 | Shih ........................ G01R 33/50 |

* cited by examiner

Input Image

Reference Image 2

Reference Image 1

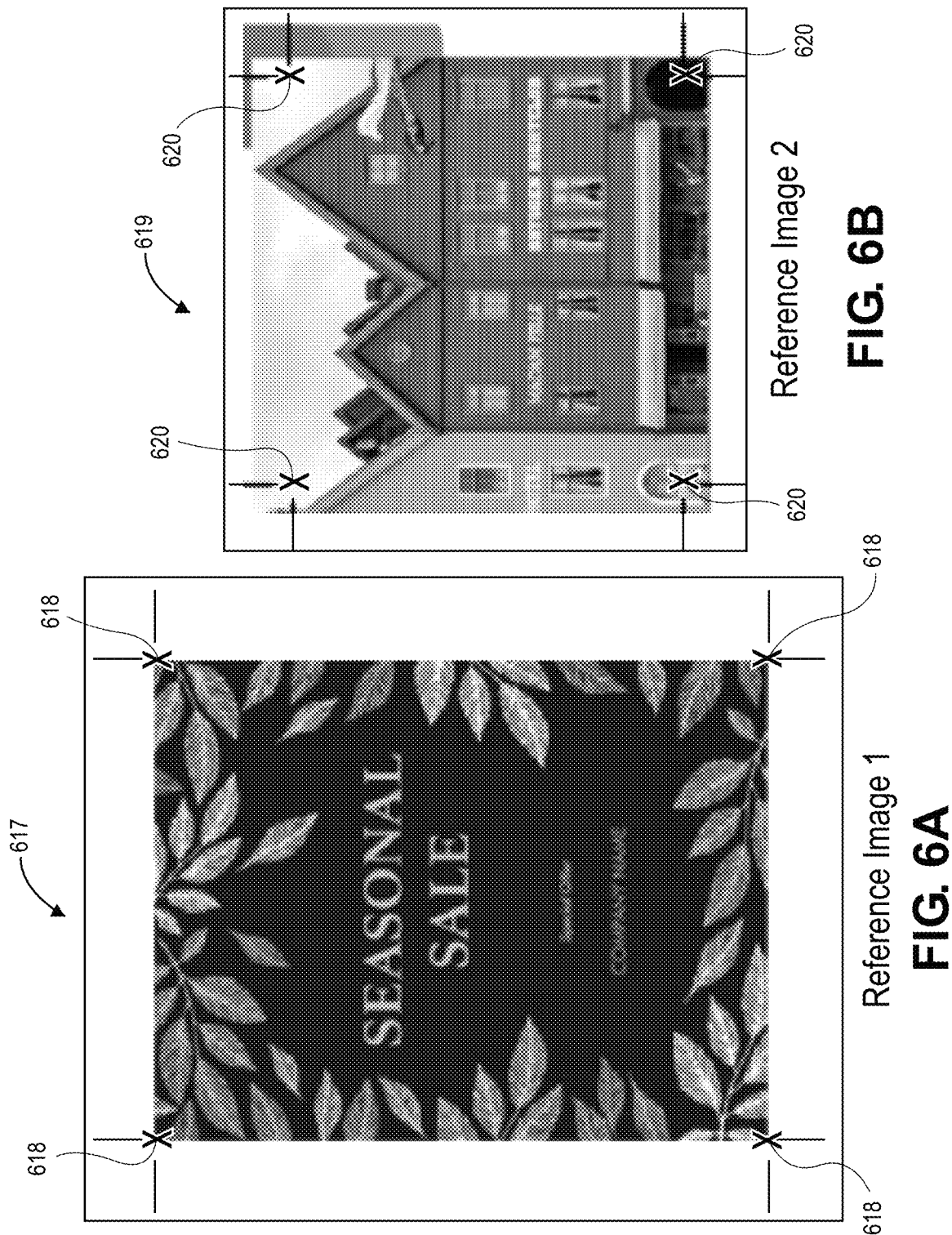

Input Image

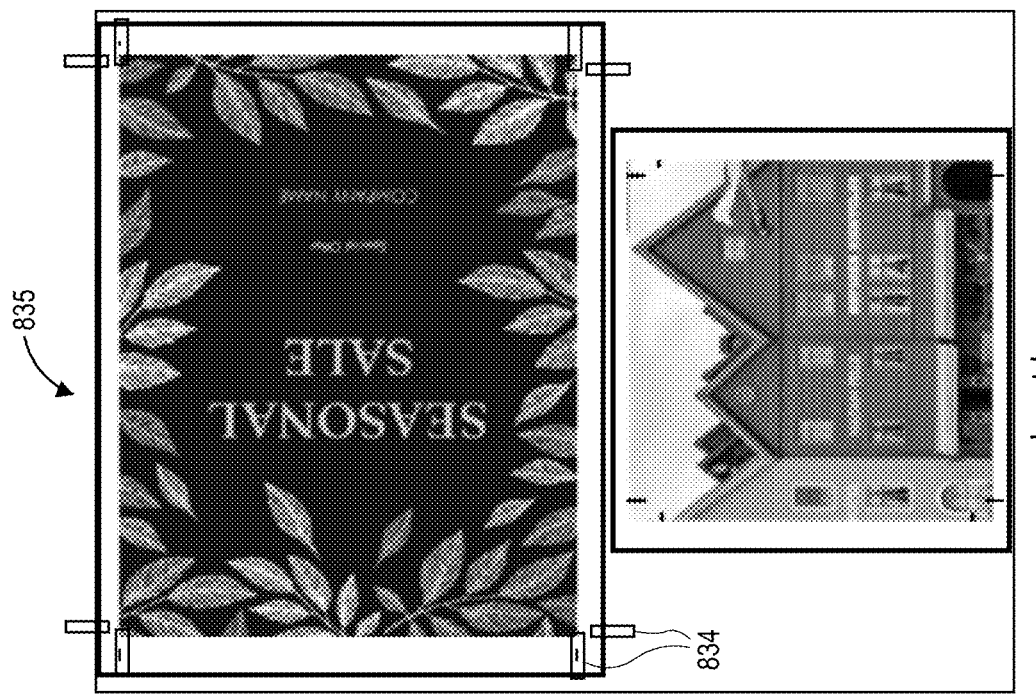
FIG. 8B Input Image
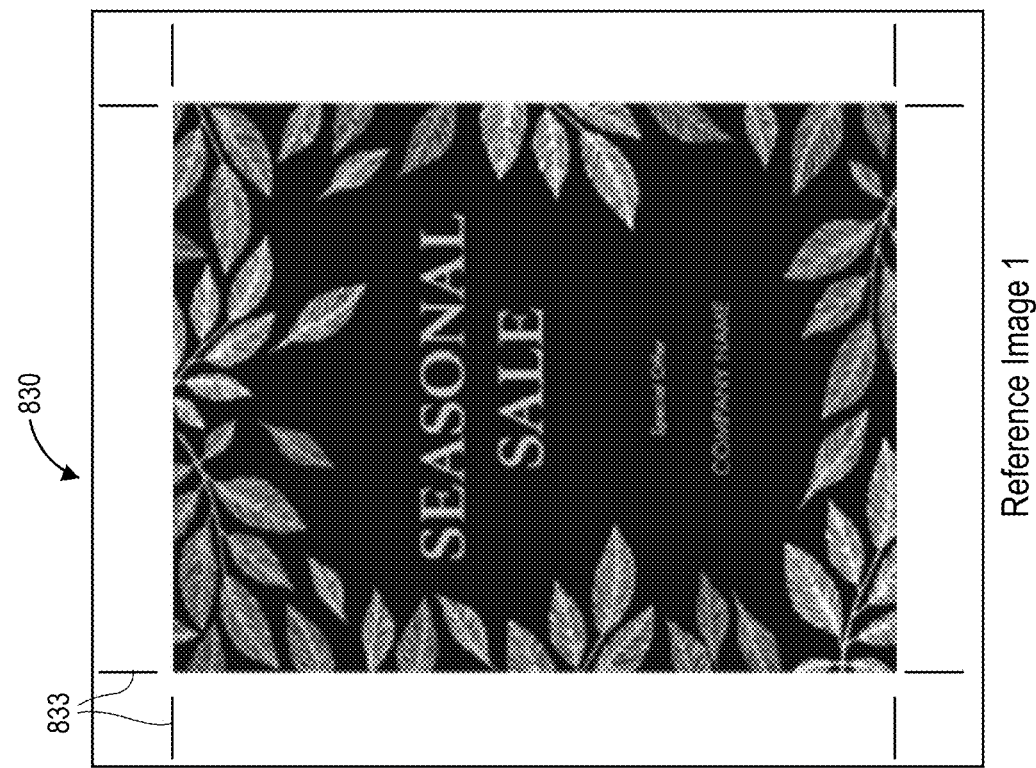
FIG. 8A Reference Image 1

Input Image

TECHNOLOGIES FOR DETECTING CROP MARKS IN ELECTRONIC DOCUMENTS USING REFERENCE IMAGES

CROSS-REFERENCE TO RELATED APPLICATIONS

This application claims priority to U.S. Patent Application No. 63/159,845, filed Mar. 11, 2021, the disclosure of which is hereby incorporated by reference in its entirety.

FIELD

The present disclosure is directed to improvements related to product customization. More particularly, the present disclosure is directed to platforms and technologies for reducing undesirable features or errors associated with the production of products having visible crop marks.

BACKGROUND

Individuals or customers frequently purchase or order products or items for certain applications or uses. For example, an individual may order customized printed products such as brochures and business cards associated with a business. Conventionally, individuals may use online design studios to customize the designs to be applied to certain products. These online design studios typically enable the individuals to modify or adjust the designs prior to the products being produced or printed.

Typically, electronic documents associated with digital designs may include crop marks, which are lines included near the corners of an electronic document to indicate where the printer (or production machine) is to trim the substrate during product printing. However, crop marks are not considered part of the content of the design to be printed, and it is therefore undesirable to have crop marks printed on a finished product. When a user uploads an electronic document that already includes crop marks, the system is tasked with locating the crop marks to avoid the crop marks being printed on the finished products, which uses resources.

Existing techniques for detecting crop marks use certain metadata (e.g., that embedded in PDF files), however these techniques are limited especially in situations in which the metadata is missing or incomplete, or where the techniques attempt to detect the crop marks directly from the electronic documents (e.g., directly from images). Additionally, users may use electronic devices to identify and remove crop marks. However, the users may not identify and remove any or all of these crop marks, or may only remove portions of these crop marks.

Thus, there is an opportunity for systems and methods to effectively and efficiently detect crop marks included in electronic documents to reduce or eliminate crop mark-related errors in producing products.

SUMMARY

In an embodiment, a computer-implemented method of detecting crop marks is provided. The computer-implemented method may include: detecting, by a processor, a set of crop marks within a reference digital image; determining, by the processor, a position of the reference digital image within an input digital image, wherein the input digital image comprises a set of partial crop marks; mapping, by the processor based on the position of the reference digital image within the input digital image, a set of locations of the set of crop marks detected in the reference digital image to the input digital image; and based on mapping the set of locations of the set of crop marks to the input digital image, detecting the set of partial crop marks within the input digital image.

In another embodiment, a system for detecting a crop marks is provided. The system may include a memory storing a set of computer-readable instructions, and a processor interfacing with the memory. The processor may be configured to execute the set of computer-readable instructions to cause the processor to: detect a set of crop marks within a reference digital image, determine a position of the reference digital image within an input digital image, wherein the input digital image comprises a set of partial crop marks, map, based on the position of the reference digital image within the input digital image, a set of locations of the set of crop marks detected in the reference digital image to the input digital image, and based on mapping the set of locations of the set of crop marks to the input digital image, detect the set of partial crop marks within the input digital image.

Further, in an embodiment, a non-transitory computer-readable storage medium having stored thereon a set of instructions, executable by at least one processor of an electronic device, for detecting crop marks is provided. The instructions may include: instructions for detecting a set of crop marks within a reference digital image; instructions for determining a position of the reference digital image within an input digital image, wherein the input digital image comprises a set of partial crop marks; instructions for mapping, based on the position of the reference digital image within the input digital image, a set of locations of the set of crop marks detected in the reference digital image to the input digital image; and instructions for, based on mapping the set of locations of the set of crop marks to the input digital image, detecting the set of partial crop marks within the input digital image.

BRIEF DESCRIPTION OF THE FIGURES

FIGS. 6A and 6B depict example reference images with detected crop marks, in accordance with some embodiments.

FIGS. 8A and 8B depict example reference and input image with crop marks being mapped between the images, in accordance with embodiments.

DETAILED DESCRIPTION

Figure 1A:
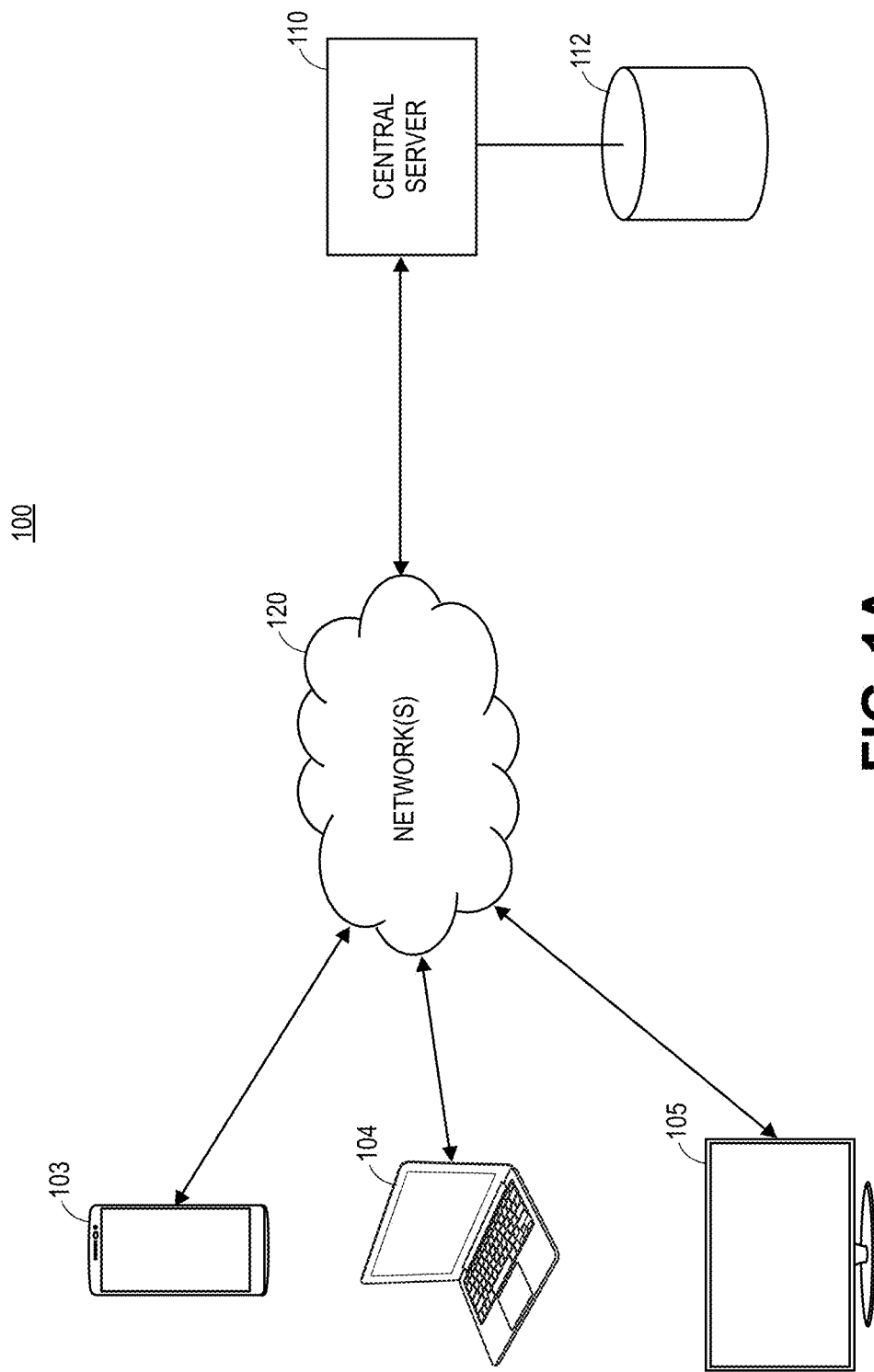
FIG. 1A depicts an overview of components and entities associated with the systems and methods, in accordance with some embodiments.

The present embodiments may relate to, inter alia, platforms and technologies for detecting crop marks within digital images. In some existing systems, a user may upload a digital image to a design platform and the user may manually remove any crop marks that may be present in the digital image using tools of the design platform. However, while removing the crop marks, the user may make a mistake and remove only part of the crop marks. A computing device that analyzes the digital image having partial crop marks may not detect or remove these partial crop marks. The present embodiments describe techniques for analyzing digital images to detect and remove partial crop marks.

According to certain aspects, the systems and methods may access a reference digital image and an input digital image each depicting a digital design or image. The input digital image may have been previously processed or analyzed to remove crop marks, however there may be full or partial crop marks remaining in the input digital image. The systems and methods may detect a set of crop marks in the reference digital image, and map locations of the set of crop marks to the input digital image. As a result of the mapping, the systems and methods may detect a set of partial crop marks in the input digital image.

The systems and methods offer numerous benefits. In particular, the image processing techniques effectively and efficiently detect crop marks within digital images, including digital images that have already undergone an initial crop mark detection and that, as a result, include partial crop marks. Further, in cases in which the initial crop mark detection manages to successfully detect and remove crop marks from a digital image, the digital image may not be flagged for a subsequent crop mark detection. By removing partial and full crop marks from digital images, the systems and methods thus prevent crop marks from being printed on the finished products. This results in fewer production errors and fewer customer complaints. Because of the reduction in production errors, platforms that offer customized product production may realize reduced costs, greater profits, and increased sales. It should be appreciated that additional benefits are envisioned.

The systems and methods discussed herein improve the functioning of a computer as well as improve virtual design platforms. Conventionally, crop mark parameters are embedded within metadata of an electronic document (e.g., a PDF file). However, techniques for detecting crop marks in a design are limited or non-existent when the crop mark parameters are not embedded within an electronic document, for example if crop marks are depicted in a digital image. Additionally, an analysis of digital images containing crop marks may not result in a detection of all of the crop marks. As a result, the crop marks that are not meant to be printed may end up being printed on a finished product. The systems and methods are an improvement to how computers process electronic images because the systems and methods automatically and dynamically detect crop marks and distinguish the crop marks from the visual content of underlying designs. In doing so, the systems and methods may apply various image processing techniques that accurately detect crop marks with limited or no instances of missed detections and false positives.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 103, 104, 105 which may be used or operated by a set of users, such as any individual or person who may be interested in purchasing items, products, and/or services that may be offered for sale by an entity. In an embodiment, the entity may be a corporation, company, partnership, retailer, wholesaler operating on behalf of another entity (e.g., a white label wholesaler), or the like, where the entity may offer an e-commerce platform (e.g., a website accessible by or an application executable by the electronic devices 103, 104, 105) and optionally a set of brick-and-mortal retail stores. Each of the electronic devices 103, 104, 105 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like.

The electronic devices 103, 104, 105 may communicate with a central server 110 via one or more networks 120. The central server 110 may be associated with the entity that owns and/or manages the e-commerce platform(s) and/or the set of brick-and-mortal retail stores. In particular, the central server 110 may include or support a web server configured to host a website that offers various products and/or services for purchase by users. Further, the central server 110 may support a software application executable by the set of electronic devices 103, 104, 105 (i.e., the set of electronic devices 103, 104, 105 may interface with the central server 110 in executing the software application). In embodiments, the network(s) 120 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

Although depicted as a single central server 110 in FIG. 1A, it should be appreciated that the server 110 may be in the form of a distributed cluster of computers, servers, machines, or the like. In this implementation, the entity may utilize the distributed server(s) 110 as part of an on-demand cloud computing platform. Accordingly, when the electronic devices 103, 104, 105 interface with the server 110, the electronic devices 103, 104, 105 may actually interface with one or more of a number of distributed computers, servers, machines, or the like, to facilitate the described functionalities.

The central server 110 may be configured to interface with or support a memory or storage 112 capable of storing various data, such as in one or more databases or other forms of storage. According to embodiments, the storage 112 may store data or information associated with products or services that are offered for sale by the entity that owns and/or manages the e-commerce platform and/or the set of brick-and-mortal retail stores. For example, the storage 112 may store information associated with office supplies such as business cards and notepads, including information associated with a customer or client (e.g., company name and logo). For further example, the storage 112 may store templates of designs, as well as information associated with the designs, including properties and dimensions of the elements/components of the designs.

Although three (3) electronic devices 103, 104, 105, and one (1) server 110 are depicted in FIG. 1A, it should be appreciated that greater or fewer amounts are envisioned. For example, there may be multiple central servers, each one associated with a different entity. Additionally, the electronic devices 103, 104, 105 and the central server 110 may interface with one or more separate, third-party servers (not depicted in FIG. 1A) to retrieve relevant data and information.

According to embodiments, users of the electronic devices 103, 104, 105 may select a design(s) of an item to preview and modify using the electronic devices 103, 104, 105, such as in contemplation of placing an order for the item(s). The design(s) may include at least one digital image in various file formats (e.g., JPEG, TIFF, GIF, PNG, Raw, etc.), where the digital image(s) may depict visual content (i.e., the design itself) that may be composed of one or more design elements. The users may use the respective electronic devices 103, 104, 105 to modify certain of the design elements.

According to embodiments, the electronic devices 103, 104, 105 may support multiple techniques for detecting and removing crop marks which may be depicted in the digital images(s), such as prior to the design(s) being produced into finished products. A first technique may detect crop marks by detecting a set of contours in a digital image, subtracting the set of contours, and detecting a set of crop marks from the digital image with the set of contours subtracted therefrom, as described in U.S. patent application Ser. No. 17/104,581, now U.S. Pat. No. 11,145,064, and entitled "Technologies for Detecting Crop Marks in Electronic Documents," which is hereby incorporated by reference in its entirety. Further, the electronic devices 103, 104, 105 may support an additional technique for detecting and removing crop marks from the digital image(s), which is further described with respect to FIGS. 1B and 2.

Figure 1B:
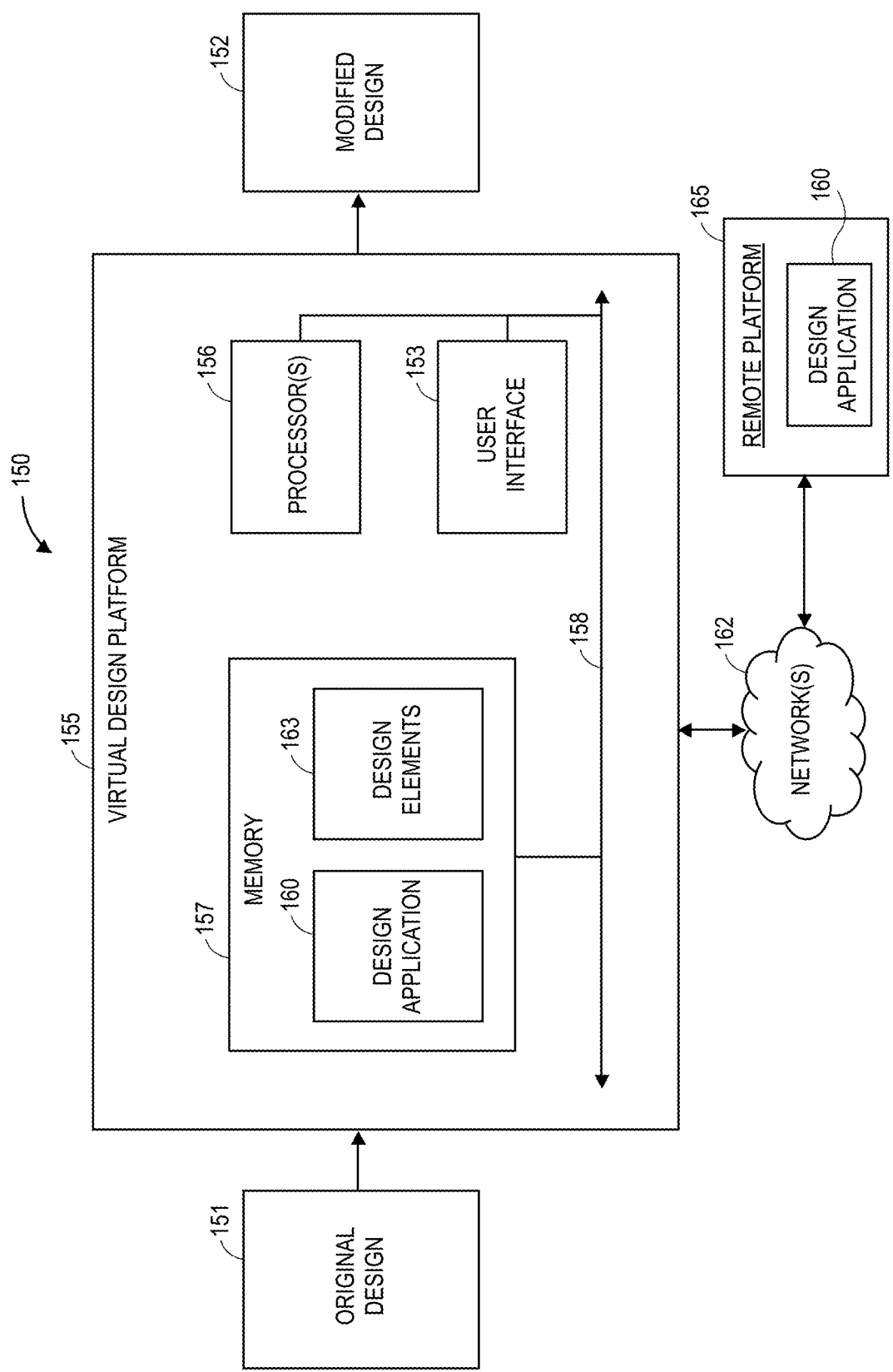
FIG. 1B depicts an overview of certain components configured to facilitate the systems and methods, in accordance with some embodiments.

FIG. 1B depicts an example environment 150 in which an original design 151 is processed into a modified design 152 via a virtual design platform 155, according to embodiments. The virtual design platform 155 may be implemented on any computing device, including one or more of the electronic devices 103, 104, 105 or the server 110 as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156. In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The virtual design platform 155 may further include a user interface 153 configured to present content (e.g., designs and components/elements thereof). Additionally, a user may make selections to the content via the user interface 153, such as to modify designs (or design elements thereof) presented thereon. The user interface 153 may be embodied as part of a touchscreen configured to sense touch interactions and gestures by the user. Although not shown, other system components communicatively coupled to the system bus 158 may include input devices such as a cursor control device (e.g., a mouse, trackball, touch pad, etc.) and a keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., a design application 160) data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156.

The virtual design platform 155 may operate in a networked environment and communicate with one or more remote platforms, such as a remote platform 165, via a network 162, such as a local area network (LAN), a wide area network (WAN), or other suitable network. The platform 165 may be implemented on any computing device, including one or more of the electronic devices 103, 104, 105 or the server 110 as discussed with respect to FIG. 1A, and may include many or all of the elements described above with respect to the platform 155. In some embodiments, the design application 160 as will be further described herein may be stored and executed by the remote platform 165 instead of by or in addition to the platform 155.

According to embodiments, the virtual design platform 155 (and more particularly, the design application 160) may process or modify the original design 151 to produce the modified design 152. It should also be understood that although only one of each of the original design 151 and the modified design 152 is shown, the example environment 150 may be configured to process or modify multiple designs. Each of the original design 151 and the modified design 152 may be embodied as any type of electronic document, file, template, etc., that may include a set of design elements or components, each of which may be some type of displayable content (e.g., a combination of textual and/or visual content).

According to embodiments, the original design 151 may include at least one digital image in various file formats (e.g., JPEG, TIFF, GIF, PNG, Raw, etc.). However, it should be appreciated that other formats for the original design 151 are envisioned (e.g., PDF, DOC, HWP, ODT, PAGES, RTF, etc.). According to embodiments, the design application 160 may execute or facilitate various image processing techniques to detect and remove crop marks that may be depicted in the original design 151. The memory 157 may further store design elements 163 accessible to the design application 160, and the design application 160 may additionally process the original design 151 by modifying, deleting, inserting, and/or replacing certain of the set of design elements, or parameters thereof, included in the original design 151. Each of the design elements included in the original design 151 and in the design elements 163 may have associated metadata that may define how the corresponding design element is to be presented within the original design 151 and/or modified based on a modification(s) to another design element(s). In embodiments, the designs 151, 152, the design elements, and the metadata thereof may be implemented using any type of file format.

Figure 2:
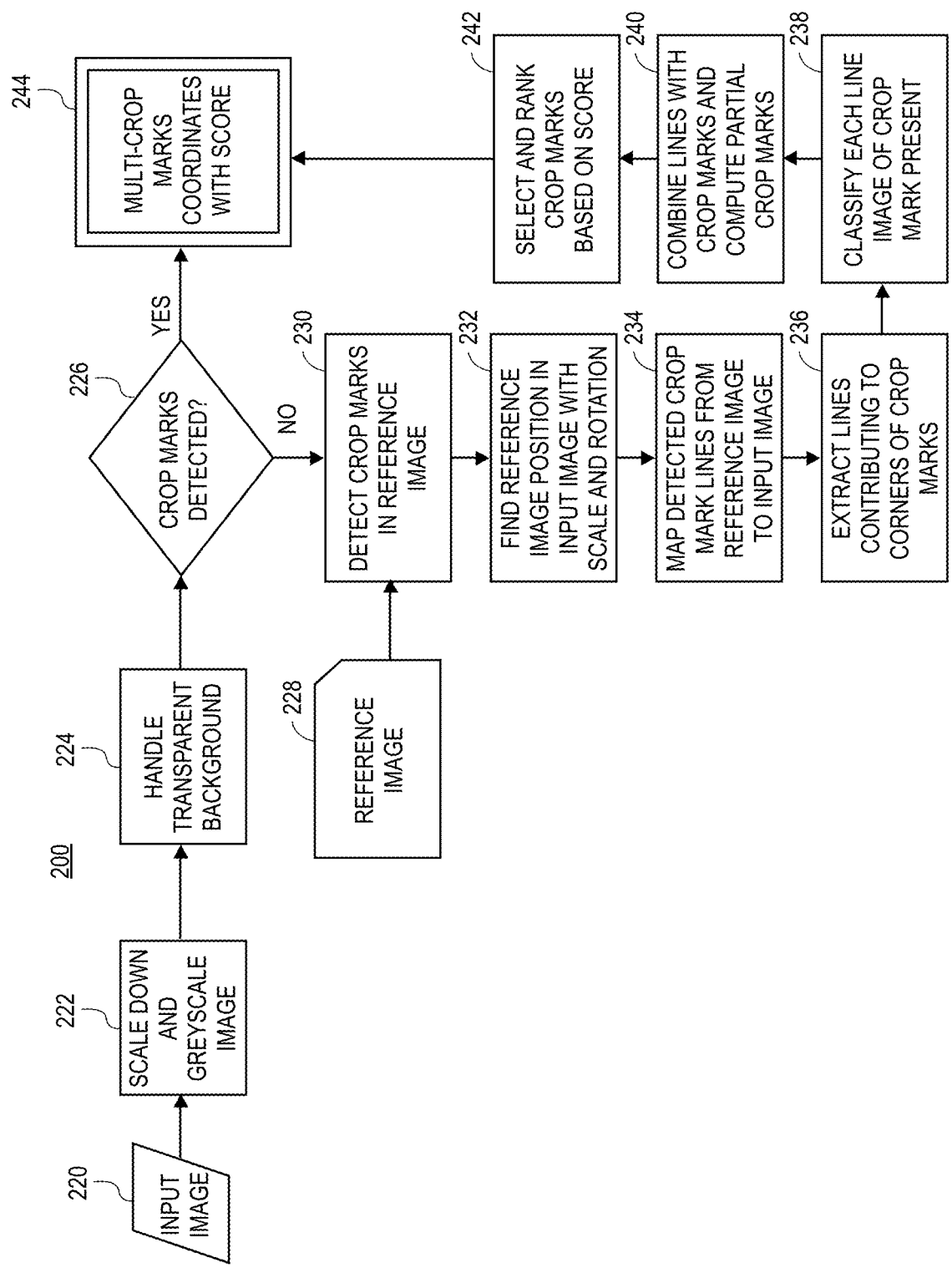
FIG. 2 illustrates various functionalities associated with crop mark detection, in accordance with some embodiments.

FIG. 2 illustrates an example flow 200 associated with the systems and methods. The flow 200 may be implemented on, executed, or facilitated by a computing device and/or components thereof, such as one or more of the electronic devices 103, 104, 105 or the central server 110 as discussed with respect to FIG. 1A, or the virtual design platform 155 as discussed with respect to FIG. 1B.

The example flow 200 describes various functionalities that may be performed on an input image 220 and a reference image 228. According to embodiments, a reference image (or reference digital image) may be an image that is originally uploaded by a user, where the reference image may depict a digital design that user wishes to have printed or otherwise physically produced. In contrast, an input image (or input digital image) may be an image that depicts a digital design that has been edited, processed, or analyzed in preparation for printing or production. In embodiments, a user may use an electronic device to access a reference image and select to remove a set of crop marks that may be visible in the reference image. This resulting image may be additionally processed or analyzed in an attempt to detect and remove any remaining crop marks. However, in some instances, the editing and processing of a reference image may not remove all of the crop marks in the reference image, and/or may only partially remove the crop marks in the reference image. In any case, an input image may result from the editing and processing of a reference image, where the input image may (or may not) still include a set of partial (or full) crop marks.

The flow 200 may include the input image 220 (e.g., a digital image) which the computing device may scale down and greyscale (222), such as to increase performance. According to aspects, the computing device may resize the image to a standard size while maintaining its aspect ratio. Additionally or alternatively, the computing device may scale down the image size if it is greater than a predefined threshold. For example, if the input image 220 has a size of 5000×5000 pixels, the computing device may scale down the size to 1500×1500 pixels. In situations in which the size of the input image 220 is less than the predefined threshold, the computing device may determine to not resize the input image 220. After resizing (or determining not to resize) the input image 220, the computing device may convert the input image 220 into a greyscale version.

The computing device may next handle (224) any transparent background that may be present in the input image 220. In particular, the computing device may convert any transparent background to a solid color background.

After processing the input image 220 in (222) and (224), the computing device may determine (226) whether any crop marks are present in the processed input image. The crop mark detection performed in (226) is described in U.S. patent application Ser. No. 17/104,581, which is hereby incorporated by reference in its entirety. In particular, the computing device may detect a first set of lines depicted in the processed digital image and indicative of content of interest extracted from the digital image, and detect a second set of lines depicted in a subtracted digital resulting from subtracting a set of contours from the processed digital image. The computing device may further determine the set of crop marks from the first and second sets of lines.

If the computing device detects the crop marks in (226) ("YES"), processing may proceed to (244). If the computing device does not detect any crop marks in (226) ("NO"), processing may proceed to (230) in which the computing device may detect a set of crop marks in the reference image 228. According to embodiments, the crop mark detection also performed in (230) is described in U.S. patent application Ser. No. 17/104,581. Further, in embodiments, prior to detecting the set of crop marks in (230), the computing device may scale down the reference image 228, convert the reference image 228 into a greyscale version, and convert any transparent background in the reference image 228 to a solid color background. Generally, if in (230) the computing device detects a set of crop marks in the reference image 228 (after not detecting any crop marks in the input image 220 in (226)), then there is a possibility that partial crop marks are present in the input image 220. Thus, the computing device may facilitate functionalities to detect any partial crop marks in the input image 220.

Figure 7B:
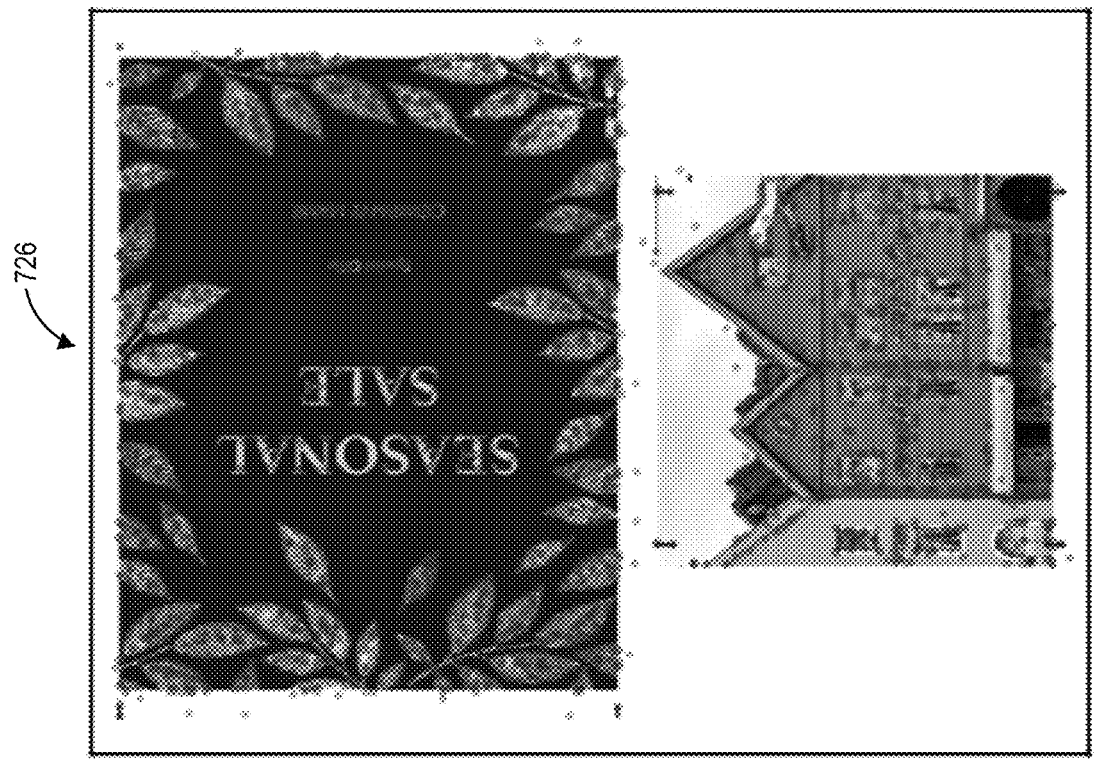
FIGS. 7A-7G depict example reference and input images, and functionalities associated with aligning reference images within input images, in accordance with some embodiments.
Figure 7A:
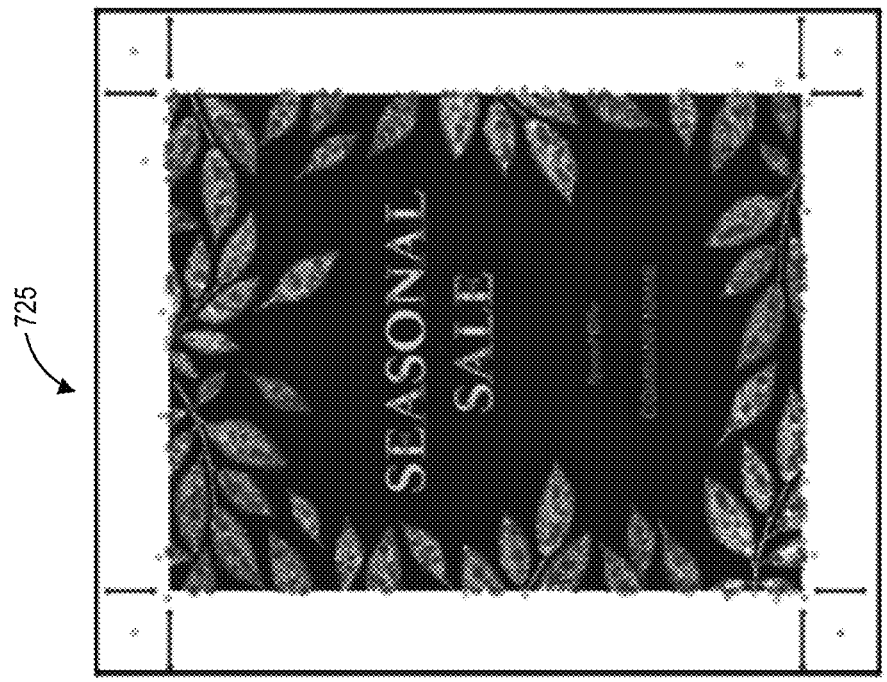

Initially, the computing device may find (232) a position of the reference image 228 in the input image 220. In particular, the computing device may compute or determine a set of "essential" or "important" features with their respective descriptors for both the input image 220 and the reference image 228. FIG. 7A depicts an example reference image with its features emphasized, and FIG. 7B depicts an example input image with two digital designs, with its features emphasized in each of the two digital designs.

Further, the computing device may measure a set of distances between the set of features of the reference image 228 and the set of features of the input image 220 to find a set of matches between the input and reference images 220, 228. If an amount of the set of matches at least meets a defined threshold value, then the computing device may deem that the reference image 228 is present in the input image 220. Conversely, if the amount of the set of matches does not meet the defined threshold value, then the computing device may deem that the reference image 228 is not present in the input image 220, and processing may end or repeat.

Figures 7C, 7D:
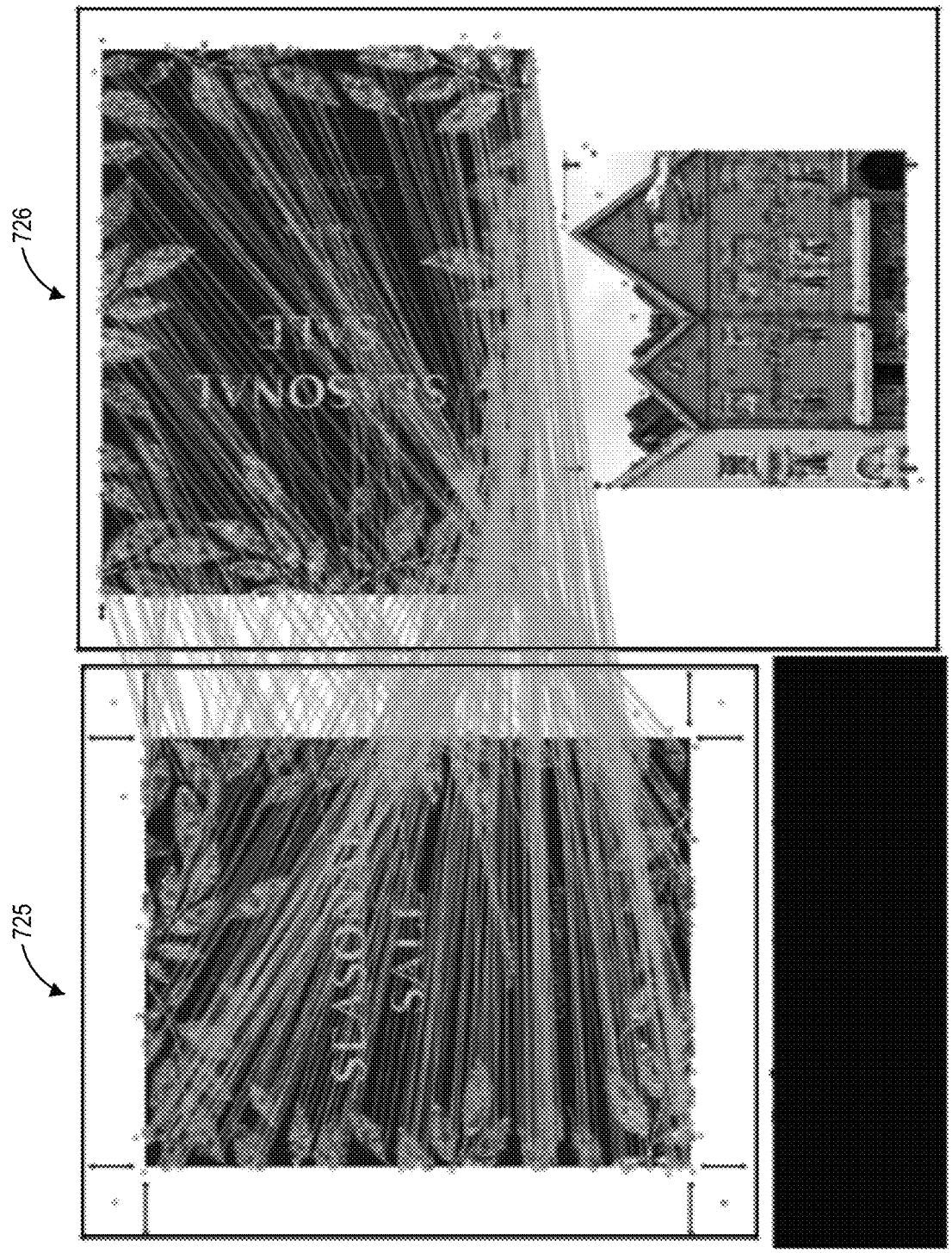

FIGS. 7C and 7D depict the features of an example reference image being mapped to a portion of an example input image. Similarly, FIGS. 7E and 7F also depict the features of another example reference image being mapped to another portion of the example input image.

Figures 7E, 7F:
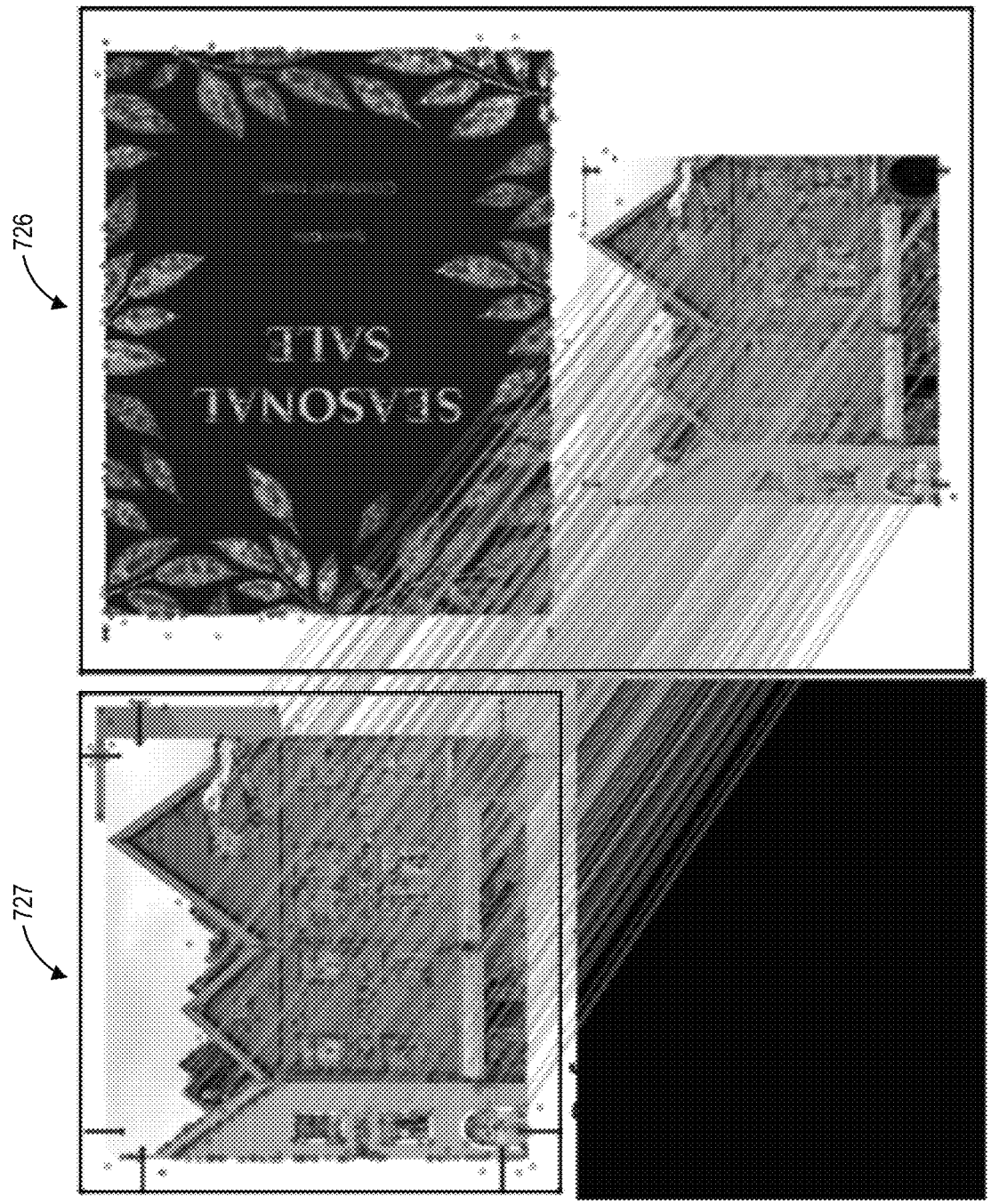
Figure 7G:
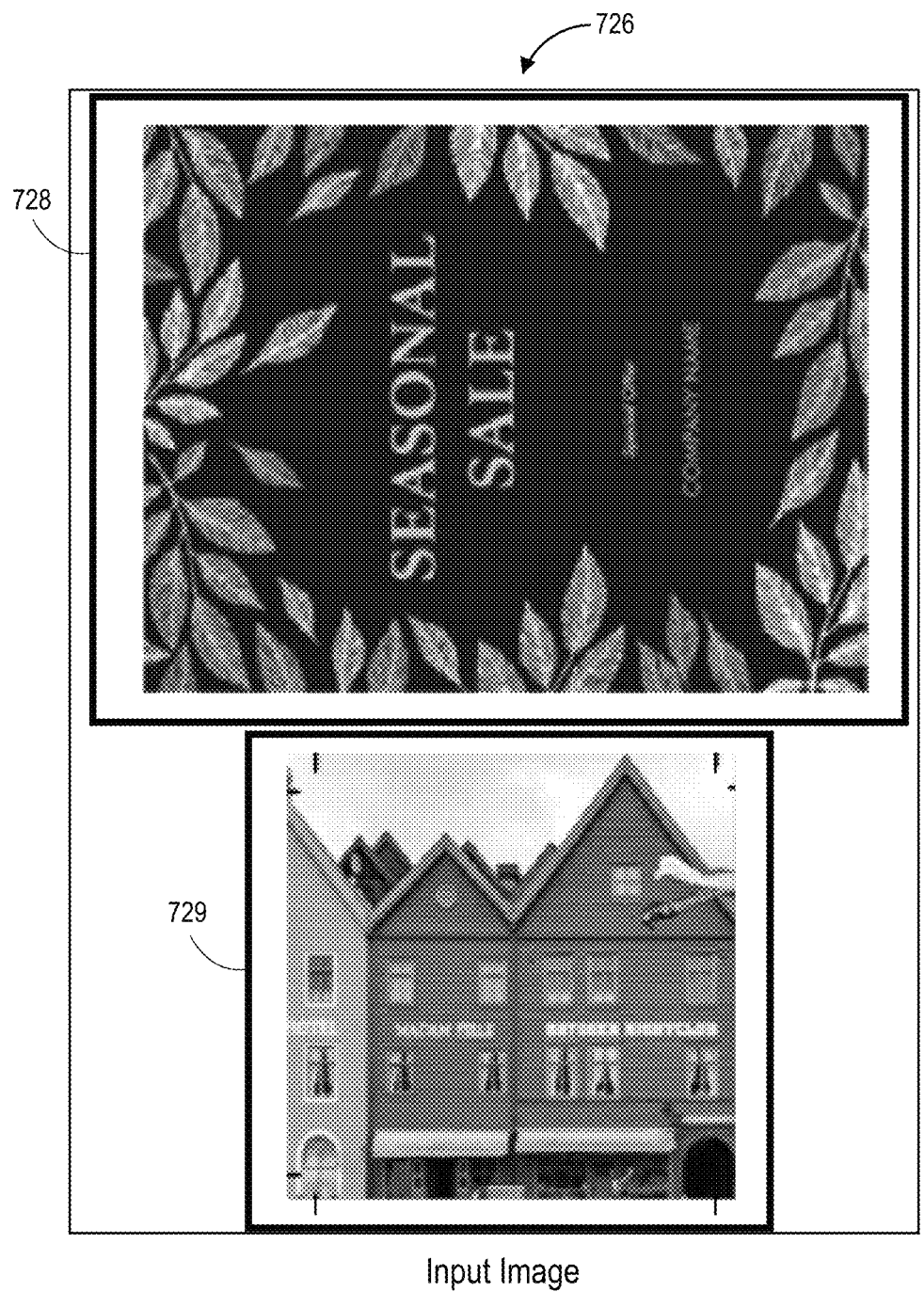

If the computing device deems that the reference image 228 is present in the input image 220, the computing device may determine or identify a homography matrix using the set of matches and compute a scale and rotation of the reference image 228 in the input image 220. FIG. 7G depicts an example input image with two (2) reference images overlaid thereon in an appropriate scale and angle, showing that the reference images were found in the input image.

The computing device may map (234) detected crop mark lines from the reference image 228 to the input image 220. Because the position(s) of the crop marks in the reference image 228 and the location(s) of the reference image 228 in the input image 220 are identified or determined, the computing device may translate the crop marks with respect to the input image 220 and scale the crop marks using the origin of the reference image 228 and a scale factor. For instance, if the computing device rotates the reference image 228 in the input image 220, then the computing device may translate the crop mark lines using a computed angle. FIG. 8A depicts an example reference image and its crop marks, and FIG. 8B depicts an example input image that contains the visual design of the reference image, along with its crop marks (shown as boxes) scaled to match the size and shape of the crop marks of the reference image. Thus, the boxes in FIG. 8B may represent (i) the crop marks located in the reference image, and (ii) the probable locations where crop marks may be found in the input image.

The computing device may extract (236) lines/patches that contribute to the corners of crop marks. In particular, the computing device may extract the boxes (e.g., the boxes in FIG. 8B), each of which may or may not include at least a portion of a crop mark. The computing device may classify (238) each line/patch depending on whether it contains at least a portion of a crop mark. According to embodiments, the computing device may assess, for each line/patch, whether there is a gradient change in pixel values; and if there is (e.g., if the gradient change at least meets a threshold value), the computing device may deem that there is a crop mark in that line/patch. Similarly, if there is not a gradient change in pixel values for a given line/patch, the computing device may deem that there is not a crop mark in that line/patch. The computing device may combine (240) the lines with crop marks and compute any partial crop marks.

Figure 9:
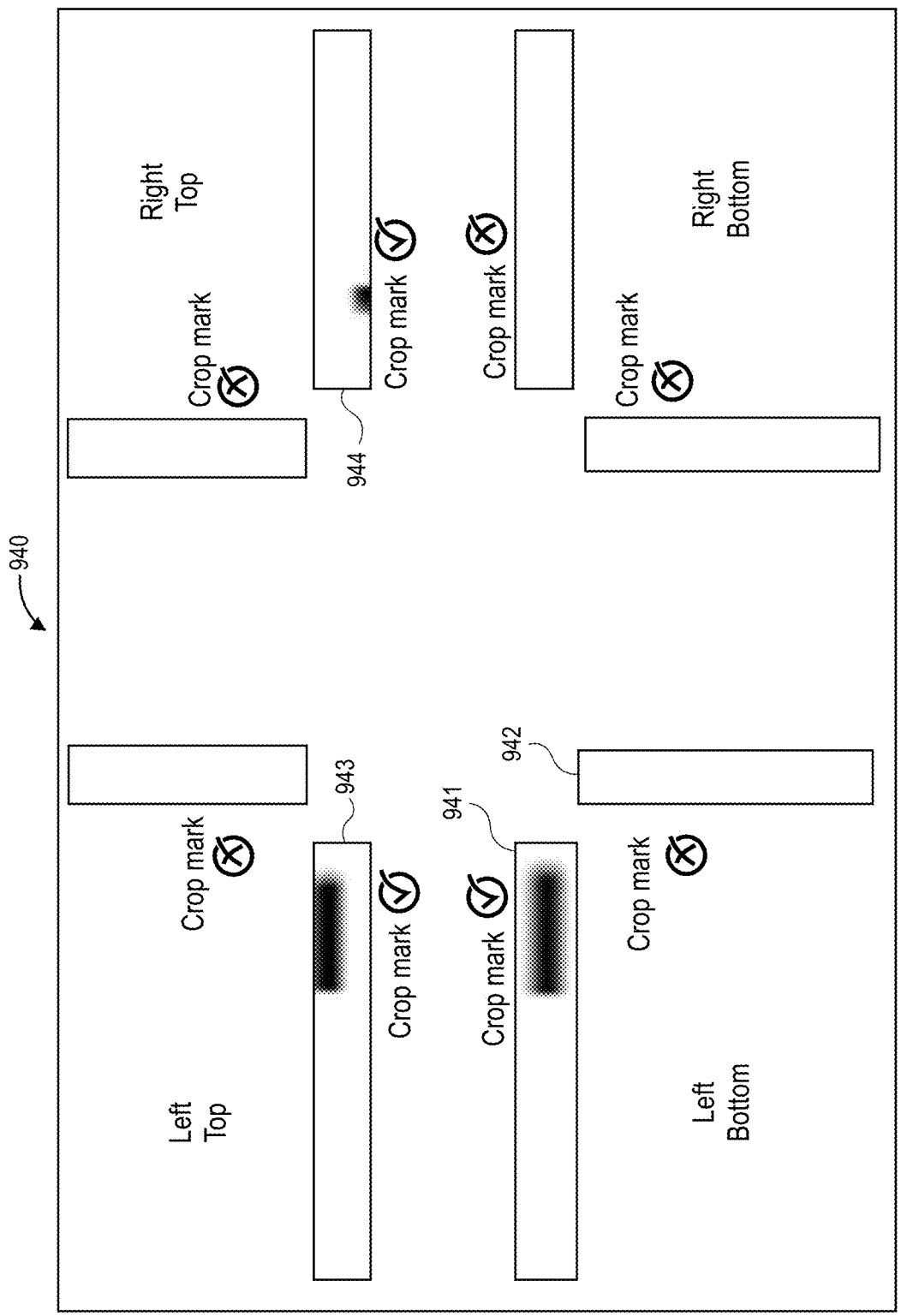
FIG. 9 depicts a representation of detecting crop marks, in accordance with some embodiments.

For example, FIG. 9 depicts a set of eight (8) lines/patches: two (2) for each of the top left corner, top right corner, bottom left corner, and bottom right corner. Further, as depicted in FIG. 9, the computing device detects a total of three (3) crop marks: in a patch 941, a patch 943, and a patch 944. Each of the patches 941, 943, 944 in which the crop marks are detected may include gradient changes that at least meet a threshold value. The computing device may deem the remaining patches in in the set of eight (8) lines/patches as not including crop marks.

The computing device may select and rank (242) crop marks based on a score. In particular, the computing device may calculate, based on the respective calculated gradient changes for given lines/patches, a score (e.g., between 0 and 1) for each of the lines/patches. Accordingly, the computing device may rank the lines/patches based on descending score, from most likely to include a partial crop mark to least likely to include a partial crop mark (or vice-versa).

At (244), the computing device may calculate and output crop mark coordinates with their respective scores. In particular, the computing device may compute, for each detected crop mark in its respective corner, an intersection point (i.e., coordinates) for that crop mark. In situations in which a given line/patch includes a partial crop mark, then the computing device may deem this line/patch as having a crop mark. Then, the computing device may use the full crop mark lines present in the reference image the compute the intersection point of two perpendicular crop mark lines. For example, assume that in the top left corner of a reference image a crop mark of one vertical and one horizontal line is present. Then, using some tools, a designer removed the vertical line but part of the horizontal line remains as part of an input image. In this case, the computing device may still use the vertical and horizontal lines that are present in the reference image to compute the intersection point for that crop mark set.

Accordingly, the computing device may store and access the intersection point(s) for use in producing a physical version of the digital design. For example, the computing device may automatically crop the digital design at the calculated intersection point(s) of the crop marks. It should be appreciated that other uses for the calculated intersection point(s) are envisioned.

Figure 3B:
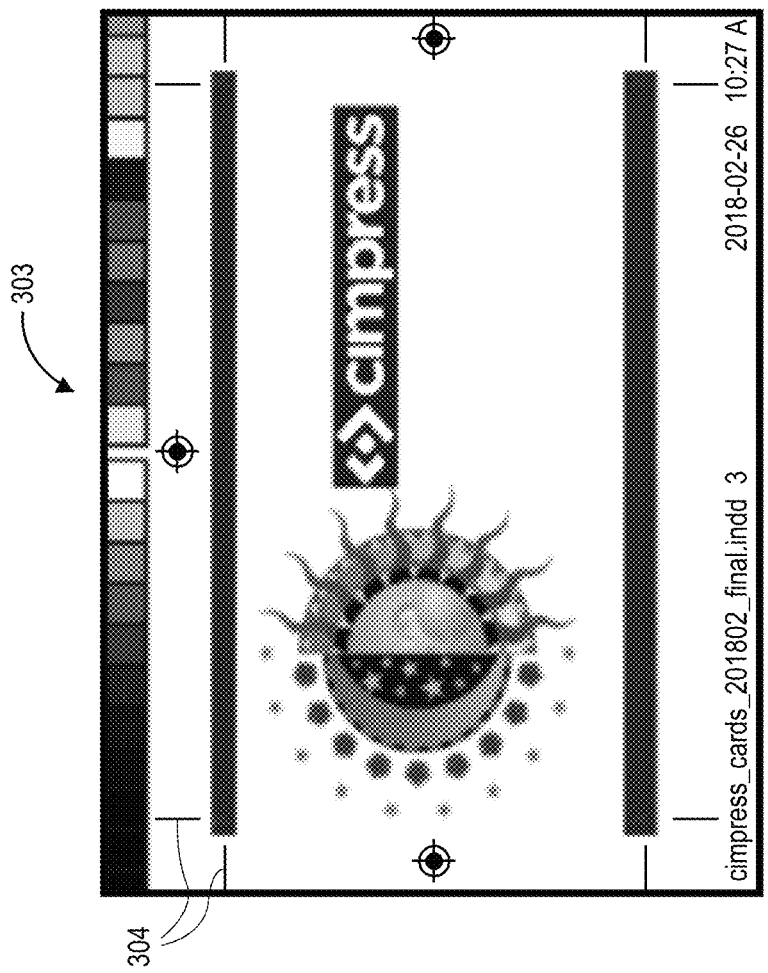
FIGS. 3A and 3B depict example images having full-length crop marks, in accordance with some embodiments.
Figure 3A:
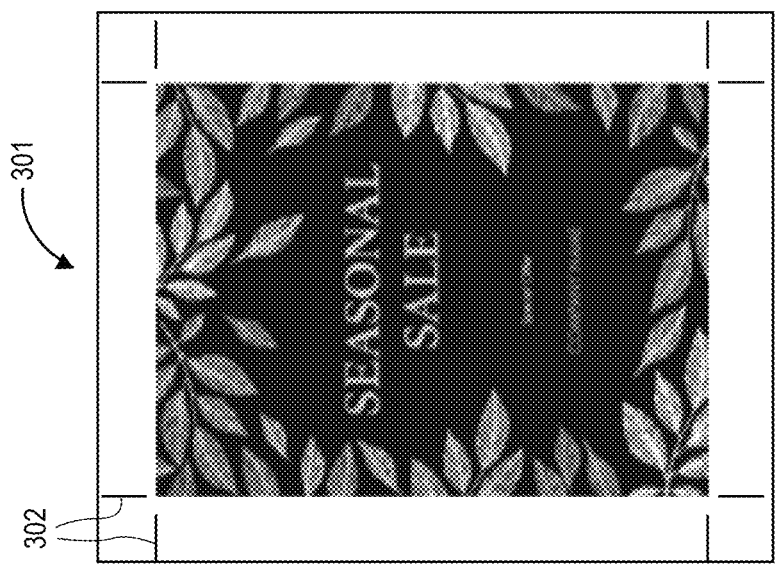

FIGS. 3A and 3B depict example images having full-length crop marks, where the example images may be in the form of reference images (i.e., before any initial crop mark detection and/or removal). In particular, FIG. 3A illustrates an image 301 having a set of crop marks 302 that are also present in each corner of the image 302. Similarly, FIG. 3B illustrates an image 303 having a set of crop marks 304 that are also present in each corner of the image 303. According to embodiments, due to the size and presence of the full-length crop marks 302, 304 in the images 301, 303, these crop marks 302, 304 may be detected with relative ease.

Figures 4A, 4B:
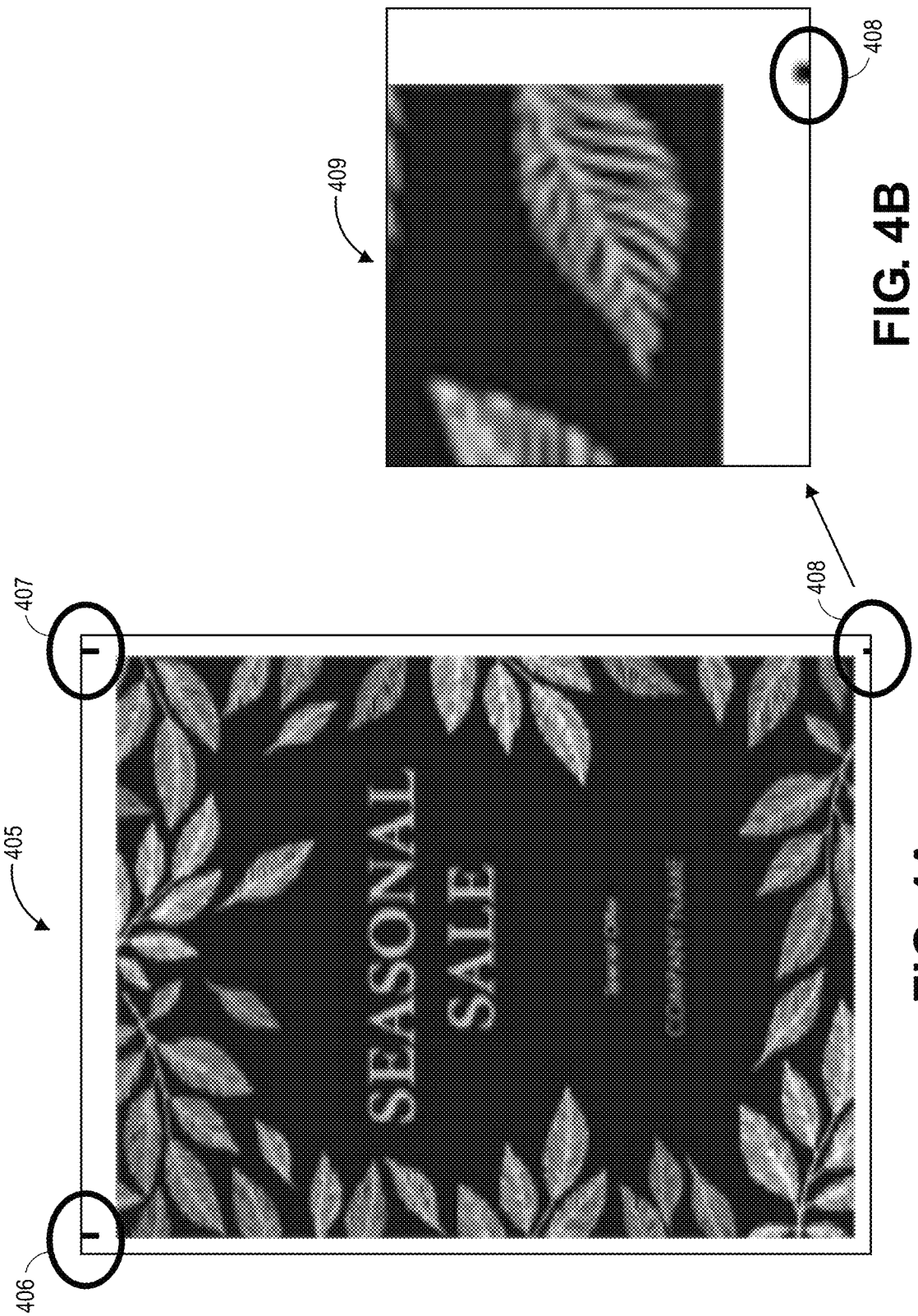
FIGS. 4A and 4B depict example images having partial crop marks, in accordance with some embodiments.

FIGS. 4A and 4B depict example images having partial crop marks, where the example images may be in the form of input images (i.e., after any initial crop mark detection and/or removal). In particular, FIG. 4A illustrates an image 405 having three (3) partial crop marks 406, 407, 408. Further, FIG. 4B illustrates an image 409 showing a more detailed view of the partial crop mark 408 as depicted in FIG. 4A. According to embodiments, partial crop marks may be present in some (or all) of the corners of an image, and may be as small as 1-3 pixels long (or other lengths), and are therefore difficult to detect.

Figure 5C:
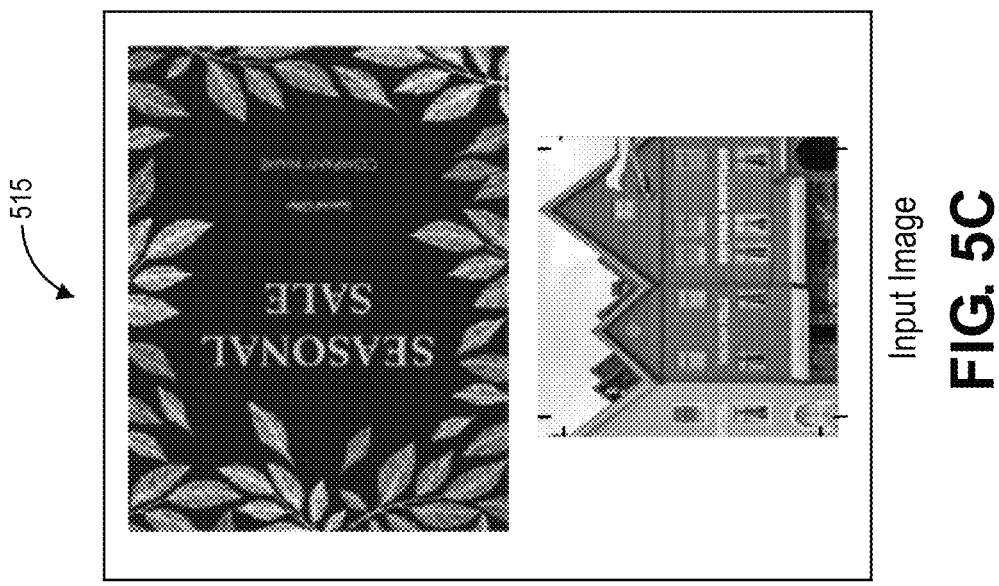
FIGS. 5A-5C depict example reference and input images, in accordance with some embodiments.
Figure 5B:
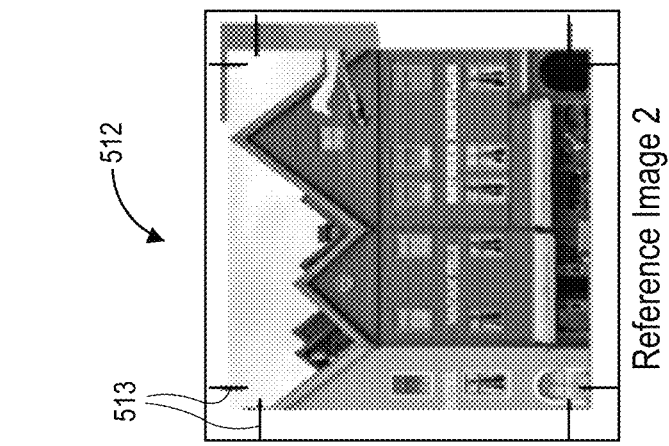
Figure 5A:
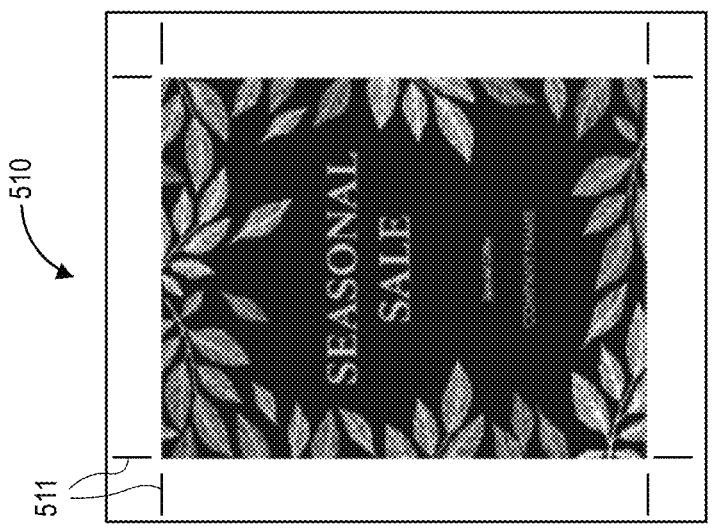

FIGS. 5A-5C depict example reference and input images. In particular, FIG. 5A depicts a reference image 510 having a set of crop marks 511 that are also present in each corner of the image 510. Similarly, FIG. 5B depicts a reference image 512 having a set of crop marks 513 that are also present in each corner of the image 512. FIG. 5C depicts an input image 515 that depicts versions of the reference images 510, 512, such as after a computing device attempts to detect and remove the crop marks present in the reference images 510, 512. Accordingly, the input image 515 may depict versions of the reference images 510, 512 having partial crop marks.

FIGS. 6A and 6B depict example reference images with detected crop marks. In particular, FIG. 6A depicts a reference image 617 that is the same as the reference image 510 of FIG. 5A, where a computing device has detected a set of crop marks 618 in each corner of the reference image 617. Similarly, FIG. 6B depicts a reference image 619 that is the same as the reference image 512 of FIG. 5B, where a computing device has detected a set of crop marks 620 in each corner of the reference image 619.

FIGS. 7A-7G depict example reference and input images, and functionalities associated with aligning reference images within input images. In particular, FIG. 7A illustrates a reference image 725, where a computing device detects and highlights, within the reference image 725, a set of features which may be deemed essential or important. Similarly, FIG. 7B illustrates an input image 726, where a computing device detects and highlights, within the input image 726, a set of features which may be deemed essential or important.

FIG. 7C depicts the reference image 725 and FIG. 7D depicts the input image 726, where FIGS. 7C and 7D additionally depict a set of feature matches between the reference image 725 and the input image 726 (i.e., the features in the reference image 725 are matched to the same features in the input image 726). Similarly, FIG. 7E depicts another reference image 727 and FIG. 7F depicts the input image 726, where FIGS. 7E and 7F additionally depict a set of feature matches between the reference image 727 and the input image 726 (i.e., the features in the reference image 727 are matched to the same features in the input image 726).

According to embodiments, a computing device may measure a set of distances between the sets of features determined in a given reference image and input image to detect matches between the reference and input images. If the computing device determines that an amount of matches is higher than a defined threshold, the computing device may determine that the reference image is present in the input image. Additionally, the computing device may determine a homography matrix using the detected matches, and compute a scale and rotation of the reference image in the input image. FIG. 7G depicts the input image 726, where a scale and angle of a set of reference images 728, 729 are depicted therein.

FIGS. 8A and 8B depict example reference and input images with crop marks being mapped between the images. In particular, FIG. 8A depicts a reference image 830 which may be the same as the reference image 510 depicted in FIG. 5A. The reference image 830 may include a set of crop marks 831 that are also present in each corner of the image 830. FIG. 8B depicts an input image 835 having the design of the reference image 830 included therein.

As discussed with respect to the previous figures, the computing device calculates or determines the position of the crop marks in the reference image 830 as well as the location of the reference image 830 within the input image 835. Thus, the computing device may determine the location of the original crop marks included in the reference image 830 within the input image 835, where these locations within the input image 835 are shown as boxed rectangles. For example, a set of potential crop mark locations 834 in the input image 835 correspond to the set of crop marks 831 in the reference image 830.

FIG. 9 depicts a representation 940 of the boxed rectangles as depicted in FIG. 8B. According to embodiments, the computing device may analyze the content within the boxed rectangles to determine whether the boxed rectangles contain partial (or full) crop marks. In particular, the computing device may calculate or determine a gradient change in pixel values in each boxed rectangle to classify whether a crop mark is present inside the given boxed rectangle.

As illustrated in FIG. 9, boxed rectangles 941, 942 correspond to the set of potential crop mark locations 834 in the input image 835 as depicted in FIG. 8B, where a partial crop mark is present in the boxed rectangle 941 but not present in the boxed rectangle 942. Similarly, the computing device detects partial crop marks within the boxed rectangles 943, 944.

Figure 10:
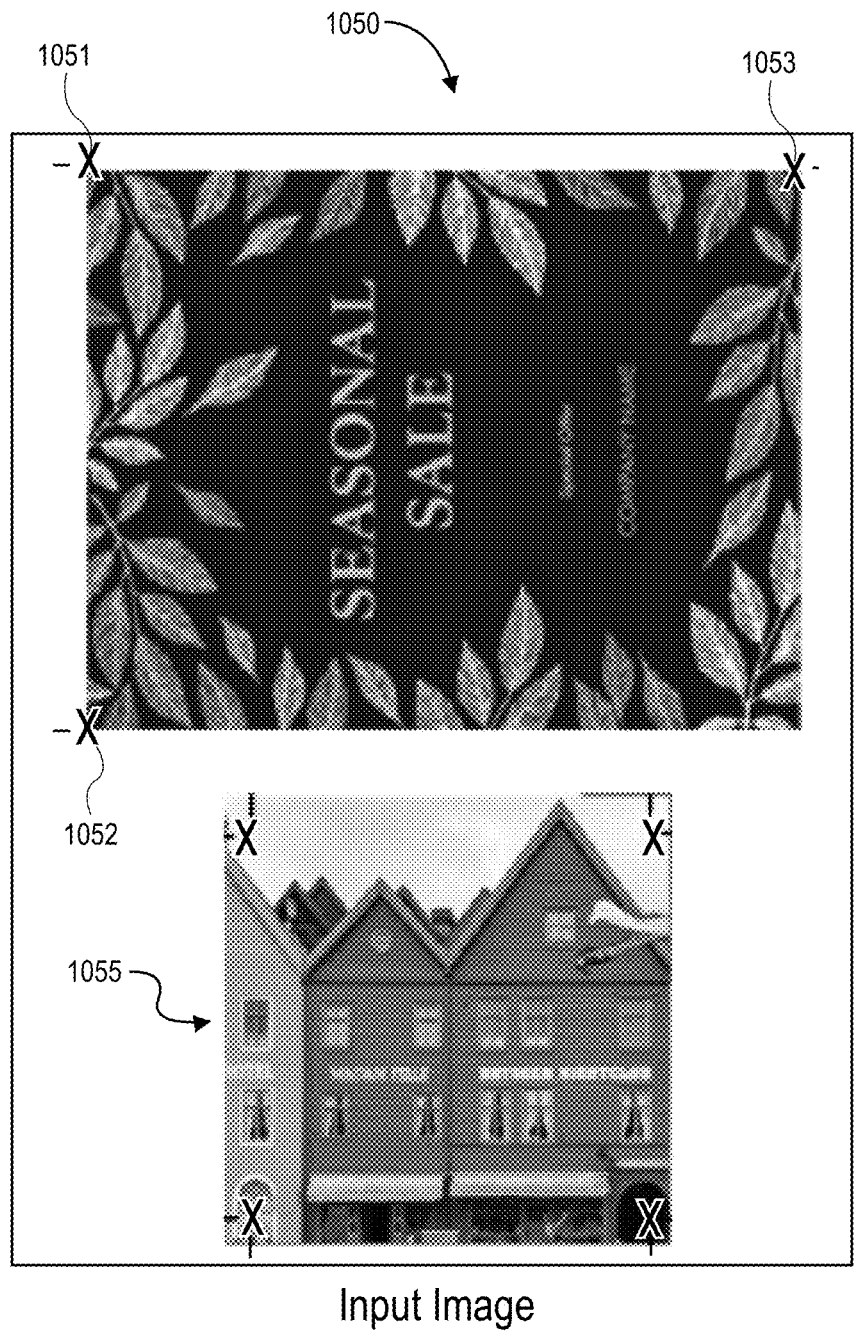
FIG. 10 depicts an input image depicting locations of intersection points of crop marks, in accordance with some embodiments.

FIG. 10 depicts an input image 1050 (which may be the same as the input image 515 as discussed with respect to FIG. 5C) depicting locations of the intersection points of crop marks detected within the input image 1050. In particular, the input image 1050 includes an "X" marking at locations 1051, 1052, 1053 corresponding to the intersection points of the crop marks detected within the boxed rectangles of FIGS. 8B and 9. FIG. 10 lacks an "X" marking in the bottom right corner because this corner of the design in the input image 1050 lacks the presence of a partial crop mark. The computing device may similarly calculate the intersection points of the crop marks detected in an additional design 1055 within the input image 1050.

Figure 11:
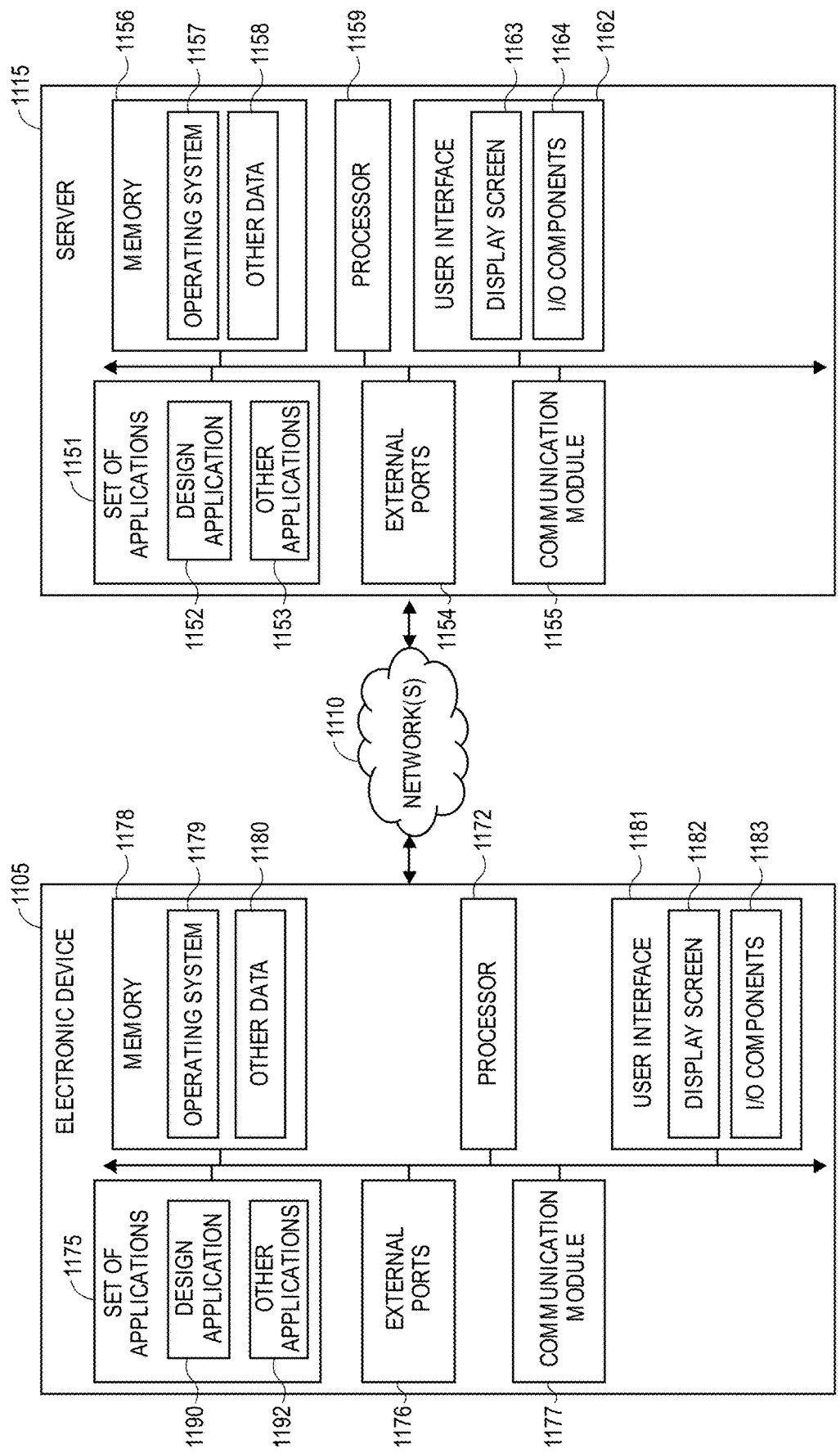
FIG. 11 is a block diagram of an example electronic device and an example server, in accordance with some embodiments.

FIG. 11 illustrates a hardware diagram of an example electronic device 1105 (such as one of the electronic devices 103, 104, 105 as discussed with respect to FIG. 1A) and an example server 1115 (such as the server computer 110 as discussed with respect to FIG. 1A), in which the functionalities as discussed herein may be implemented.

The electronic device 1105 may include a processor 1172 as well as a memory 1178. The memory 1178 may store an operating system 1179 capable of facilitating the functionalities as discussed herein as well as a set of applications 1175 (i.e., machine readable instructions). For example, one of the set of applications 1175 may be a design application 1190 configured to facilitate functionalities associated with detecting and removing crop marks depicted in digital images, as discussed herein. It should be appreciated that one or more other applications 1192 are envisioned.

The processor 1172 may interface with the memory 1178 to execute the operating system 1179 and the set of applications 1175. According to some embodiments, the memory 1178 may also include other data 1180 including data associated with digital designs and/or other data. The memory 1178 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 1105 may further include a communication module 1177 configured to communicate data via one or more networks 1110. According to some embodiments, the communication module 1177 may include one or more transceivers (e.g., WWAN, WLAN, and/or WPAN transceivers) functioning in accordance with IEEE standards, 3GPP standards, or other standards, and configured to receive and transmit data via one or more external ports 1176. For example, the communication module 1177 may communicate with the server 1115 via the network(s) 1110.

The electronic device 1105 may further include a user interface 1181 configured to present information to a user and/or receive inputs from the user. As shown in FIG. 11, the user interface 1181 may include a display screen 1182 and I/O components 1183 (e.g., ports, capacitive or resistive touch sensitive input panels, keys, buttons, lights, LEDs). According to some embodiments, the user may access the electronic device 1105 via the user interface 1181 to review various designs and preview images, and make various selections.

In some embodiments, the electronic device 1105 may perform the functionalities as discussed herein as part of a "cloud" network or may otherwise communicate with other hardware or software components within the cloud to send, retrieve, or otherwise analyze data.

As illustrated in FIG. 11, the electronic device 1105 may communicate and interface with the server 1115 via the network(s) 1110. The server 1115 may include a processor 1159 as well as a memory 1156. The memory 1156 may store an operating system 1157 capable of facilitating the functionalities as discussed herein as well as a set of applications 1151 (i.e., machine readable instructions). For example, one of the set of applications 1151 may be a design application 1152 configured to facilitate functionalities associated with detecting and removing crop marks depicted in digital images, as discussed herein. It should be appreciated that one or more other applications 1153 are envisioned.

The processor 1159 may interface with the memory 1156 to execute the operating system 1157 and the set of applications 1151. According to some embodiments, the memory 1156 may also include other data 1158, such data received from the electronic device 1105 and/or other data. The memory 1156 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 1115 may further include a communication module 1155 configured to communicate data via the one or more networks 1110. According to some embodiments, the communication module 1155 may include one or more transceivers (e.g., WWAN, WLAN, and/or WPAN transceivers) functioning in accordance with IEEE standards, 3GPP standards, or other standards, and configured to receive and transmit data via one or more external ports 1154.

The server 1115 may further include a user interface 1162 configured to present information to a user and/or receive inputs from the user. As shown in FIG. 11, the user interface 1162 may include a display screen 1163 and I/O components 1164 (e.g., ports, capacitive or resistive touch sensitive input panels, keys, buttons, lights, LEDs). According to some embodiments, the user may access the server 1115 via the user interface 1162 to review information, make selections, and/or perform other functions.

In some embodiments, the server 1115 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 1172, 1159 (e.g., working in connection with the respective operating systems 1179, 1157) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Figure 12:
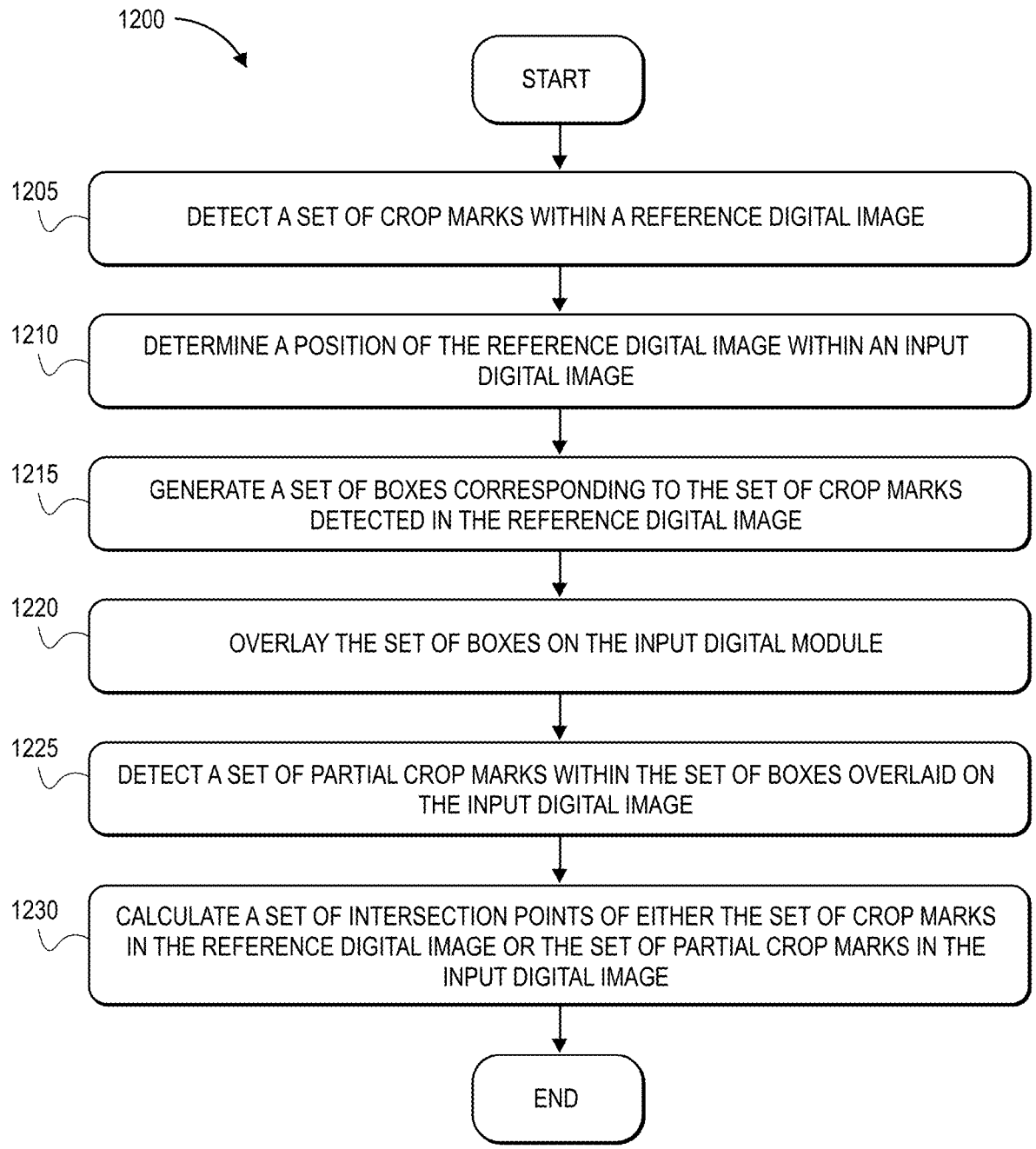
FIG. 12 depicts an example flow diagram associated with detecting crop marks, in accordance with some embodiments.

FIG. 12 depicts is a block diagram of an example method 1200 of detecting crop marks, such as crop marks in a digital image depicting a visual design. The method 1200 may be facilitated by an electronic device (such as either of the devices 103, 104, 105 as depicted in FIG. 1A) that may be in communication with a server (such as the central server 110 as discussed with respect to FIG. 1A). In embodiments, the method 1000 may be at least partially facilitated by a remote server, such as the central server 110 as discussed with respect to FIG. 1A.

The method 1200 may begin at block 1205 in which the electronic device detects a set of crop marks within a reference digital image. Further, the electronic device may determine (block 1210) a position of the reference digital image within an input digital image. According to embodiments, the electronic device may identify a set of reference features in the reference digital image and a set of input features in the input digital image and, based on the set of reference features and the set of input features, determine the position of the reference digital image within the input digital image. Further, in embodiments, the input digital image may comprise a set of partial crop marks.

The electronic device may generate (block 1215) a set of boxes (or other type of indicia or marking) corresponding to the set of crop marks detected in the reference digital image. Further, the electronic device may overlay (block 1220) the set of boxes on the input digital image according to the position of the reference digital image within the input digital image.

The electronic device may detect (block 1225) a set of partial crop marks within the set of boxes overlaid on the input digital image. According to embodiments, the electronic device may, for each of the set of boxes, analyze a gradient change in pixel values of that box, and based on analyzing the gradient change for each of the set of boxes, detect the set of partial crop marks within the set of boxes. The electronic device may further calculate (block 1230) a set of intersection points of either the set of crop marks in the reference digital image or the set of partial crop marks in the input digital image. According to embodiments, the reference digital image may have an amount of corners, and an amount of the set of intersection points may be less than the amount of corners in the reference digital image.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of detecting crop marks, the computer-implemented method comprising:
   detecting, by a processor, a set of crop marks within a reference digital image;
   determining, by the processor, a position of the reference digital image within an input digital image, wherein the input digital image comprises a set of partial crop marks;
   mapping, by the processor based on the position of the reference digital image within the input digital image, a set of locations of the set of crop marks detected in the reference digital image to the input digital image; and based on mapping the set of locations of the set of crop marks to the input digital image, detecting the set of partial crop marks within the input digital image.

2. The computer-implemented method of claim 1, wherein mapping the set of locations of the set of crop marks detected in the reference digital image to the input digital image comprises:
generating a set of boxes corresponding to the set of crop marks detected in the reference digital image; and
overlaying the set of boxes on the input digital image according to the position of the reference digital image within the input digital image.

3. The computer-implemented method of claim 2, wherein detecting the set of partial crop marks within the input digital image comprises:
detecting the set of partial crop marks within the set of boxes overlaid on the input digital image.

4. The computer-implemented method of claim 3, wherein detecting the set of partial crop marks within the set of boxes overlaid on the input digital image comprises:
for each of the set of boxes, analyzing a gradient change in pixel values of that box; and
based on analyzing the gradient change for each of the set of boxes, detecting the set of partial crop marks within the set of boxes.

5. The computer-implemented method of claim 1, further comprising:
calculating a set of intersection points of either the set of crop marks in the reference digital image or the set of partial crop marks within the input digital image.

6. The computer-implemented method of claim 5, wherein the reference digital image has an amount of corners, and wherein an amount of the set of intersection points is less than the amount of corners in the reference digital image.

7. The computer-implemented method of claim 1, wherein determining the position of the reference digital image within the input digital image comprises:
identifying a set of reference features in the reference digital image and a set of input features in the input digital image; and
based on the set of reference features and the set of input features, determining the position of the reference digital image within the input digital image.

8. A system for detecting a crop marks, comprising:
a memory storing a set of computer-readable instructions; and
a processor interfacing with the memory and configured to execute the set of computer-readable instructions to cause the processor to:
detect a set of crop marks within a reference digital image,
determine a position of the reference digital image within an input digital image, wherein the input digital image comprises a set of partial crop marks,
map, based on the position of the reference digital image within the input digital image, a set of locations of the set of crop marks detected in the reference digital image to the input digital image, and
based on mapping the set of locations of the set of crop marks to the input digital image, detect the set of partial crop marks within the input digital image.

9. The system of claim 8, wherein to map the set of locations of the set of crop marks detected in the reference digital image to the input digital image, the processor is configured to:
generate a set of boxes corresponding to the set of crop marks detected in the reference digital image, and
overlay the set of boxes on the input digital image according to the position of the reference digital image within the input digital image.

10. The system of claim 9, wherein to detect the set of partial crop marks within the input digital image, the processor is configured to:
detect the set of partial crop marks within the set of boxes overlaid on the input digital image.

11. The system of claim 10, wherein to detect the set of partial crop marks within the set of boxes overlaid on the input digital image, the processor is configured to:
for each of the set of boxes, analyze a gradient change in pixel values of that box, and
based on analyzing the gradient change for each of the set of boxes, detect the set of partial crop marks within the set of boxes.

12. The system of claim 8, wherein the processor is further configured to:
calculate a set of intersection points of either the set of crop marks in the reference digital image or the set of partial crop marks within the input digital image.

13. The system of claim 12, wherein the reference digital image has an amount of corners, and wherein an amount of the set of intersection points is less than the amount of corners in the reference digital image.

14. The system of claim 8, wherein to determine the position of the reference digital image within the input digital image, the processor is configured to:
identify a set of reference features in the reference digital image and a set of input features in the input digital image, and
based on the set of reference features and the set of input features, determine the position of the reference digital image within the input digital image.

15. A non-transitory computer-readable storage medium having stored thereon a set of instructions, executable by at least one processor of an electronic device, for detecting crop marks, the instructions comprising:
instructions for detecting a set of crop marks within a reference digital image;
instructions for determining a position of the reference digital image within an input digital image, wherein the input digital image comprises a set of partial crop marks;
instructions for mapping, based on the position of the reference digital image within the input digital image, a set of locations of the set of crop marks detected in the reference digital image to the input digital image; and
instructions for, based on mapping the set of locations of the set of crop marks to the input digital image, detecting the set of partial crop marks within the input digital image.

16. The non-transitory computer-readable storage medium of claim 15, wherein the instructions for mapping the set of locations of the set of crop marks detected in the reference digital image to the input digital image comprise:
instructions for generating a set of boxes corresponding to the set of crop marks detected in the reference digital image; and
instructions for overlaying the set of boxes on the input digital image according to the position of the reference digital image within the input digital image.

17. The non-transitory computer-readable storage medium of claim 16, wherein the instructions for detecting the set of partial crop marks within the input digital image comprise:

instructions for detecting the set of partial crop marks within the set of boxes overlaid on the input digital image.

18. The non-transitory computer-readable storage medium of claim 17, wherein the instructions for detecting the set of partial crop marks within the set of boxes overlaid on the input digital image comprise:

instructions for, for each of the set of boxes, analyzing a gradient change in pixel values of that box; and instructions for, based on analyzing the gradient change for each of the set of boxes, detecting the set of partial crop marks within the set of boxes.

19. The non-transitory computer-readable storage medium of claim 15, wherein the instructions further comprise:

instructions for calculating a set of intersection points of either the set of crop marks in the reference digital image or the set of partial crop marks within the input digital image.

20. The non-transitory computer-readable storage medium of claim 15, wherein the instructions for determining the position of the reference digital image within the input digital image comprise:

instructions for identifying a set of reference features in the reference digital image and a set of input features in the input digital image; and instructions for, based on the set of reference features and the set of input features, determining the position of the reference digital image within the input digital image.

* * * * *